US012591486B1

(12) United States Patent
Hunter et al.

(10) Patent No.: US 12,591,486 B1
(45) Date of Patent: Mar. 31, 2026

(54) DURABLE DATABASE LOG SYSTEM WITH LOW-LATENCY TRANSACTIONS STORED ACROSS MULTIPLE STORAGE NODES

(71) Applicant: Amazon Technologies, Inc., Seattle, WA (US)

(72) Inventors: James David Hunter, Snoqualmie, WA (US); Anita Zakrzewska, Redmond, WA (US); Ankesh Khandelwal, Snoqualmie, WA (US); Bryan Thompson, Seattle, WA (US); Erik Lars Hagerup, Bothell, WA (US); Tengiz Kharatishvili, Issaquah, WA (US); Zengwen Yuan, Maple Valley, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/758,671

(22) Filed: Jun. 28, 2024

(51) Int. Cl.
*G06F 11/14* (2006.01)
*G06F 11/1471* (2026.01)
*G06F 16/23* (2019.01)

(52) U.S. Cl.
CPC ...... *G06F 11/1435* (2013.01); *G06F 11/1471* (2013.01); *G06F 16/2379* (2019.01)

(58) Field of Classification Search
CPC .... G06L 1/14; G06F 11/1435; G06F 11/1471; G06F 16/2379
See application file for complete search history.

(56) References Cited

U.S. PATENT DOCUMENTS

| | | | | |
|---|---|---|---|---|
| 7,730,489 B1 * | 6/2010 | Duvur | | G06F 9/466 |
| | | | | 714/2 |
| 7,890,466 B2 * | 2/2011 | Kundu | | G06F 16/2358 |
| | | | | 707/648 |
| 9,678,824 B2 | 6/2017 | Epstein et al. | | |
| 10,007,578 B2 * | 6/2018 | Hegde | | G06F 16/2365 |
| 10,162,710 B2 * | 12/2018 | Kwon | | G06F 11/2097 |
| 10,430,103 B1 | 10/2019 | Jamail et al. | | |
| 10,599,637 B2 * | 3/2020 | Marcotte | | G06F 16/1734 |
| 10,649,845 B2 | 5/2020 | Lazier | | |
| 10,901,643 B2 | 1/2021 | Jamail et al. | | |
| 10,970,175 B2 | 4/2021 | Schreter | | |
| 2007/0266197 A1 * | 11/2007 | Neyama | | G06F 3/0676 |
| | | | | 710/310 |
| 2012/0041926 A1 * | 2/2012 | Kundu | | G06F 16/2358 |
| | | | | 707/648 |
| 2012/0166407 A1 * | 6/2012 | Lee | | G06F 9/466 |
| | | | | 707/703 |
| 2013/0254488 A1 * | 9/2013 | Kaxiras | | G06F 9/3004 |
| | | | | 711/130 |
| 2017/0068602 A1 * | 3/2017 | Cadarette | | G06F 16/2365 |

(Continued)

*Primary Examiner* — Kamini B Patel
(74) *Attorney, Agent, or Firm* — Alexander A. Knapp; Kowert, Hood, Munyon, Rankin & Goetzel, P.C

(57) ABSTRACT

A database system with multiple logs uses a summary log to speed recovery of the database in the event of a crash at the storage nodes. The database durability system is able to operate with higher throughput using multiple logs as opposed to a single log, because a database durability system using a single log is vulnerable to a bottleneck. Additionally, transactions can be durable and can be acknowledged to a requesting client as committed without waiting for a summary acknowledgement to be written to a summary log.

20 Claims, 12 Drawing Sheets

(56)        References Cited

U.S. PATENT DOCUMENTS

2021/0117274 A1*   4/2021  Federwisch ........... G06F 3/0683
2022/0083437 A1*   3/2022  Zou ..................... G06F 11/1438
2022/0335063 A1*  10/2022  McKee ................ G06F 16/273

* cited by examiner

First Availability Zone
402

Datacenter
408A

Local Computing Devices
108

Datacenter
408B

Redo Log
104

Second Availability Zone
404

Datacenter
408C

Redo Log
104

Third Availability Zone
406

Datacenter
408D

Redo Log
104

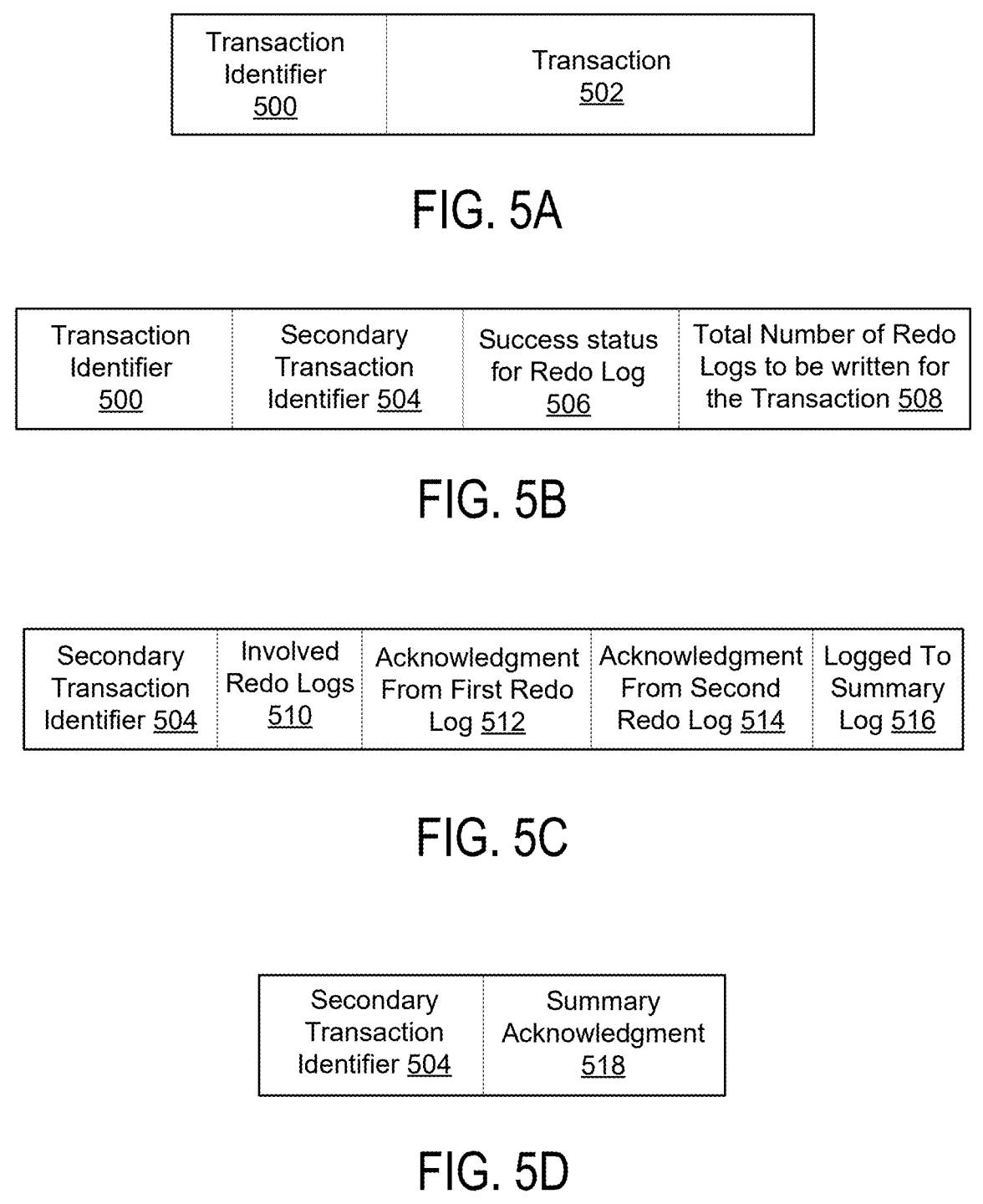

| Transaction Identifier 500 | Transaction 502 |
|---|---|

FIG. 5A

| Transaction Identifier 500 | Secondary Transaction Identifier 504 | Success status for Redo Log 506 | Total Number of Redo Logs to be written for the Transaction 508 |
|---|---|---|---|

FIG. 5B

| Secondary Transaction Identifier 504 | Involved Redo Logs 510 | Acknowledgment From First Redo Log 512 | Acknowledgment From Second Redo Log 514 | Logged To Summary Log 516 |
|---|---|---|---|---|

FIG. 5C

| Secondary Transaction Identifier 504 | Summary Acknowledgment 518 |
|---|---|

FIG. 5D

Time 612

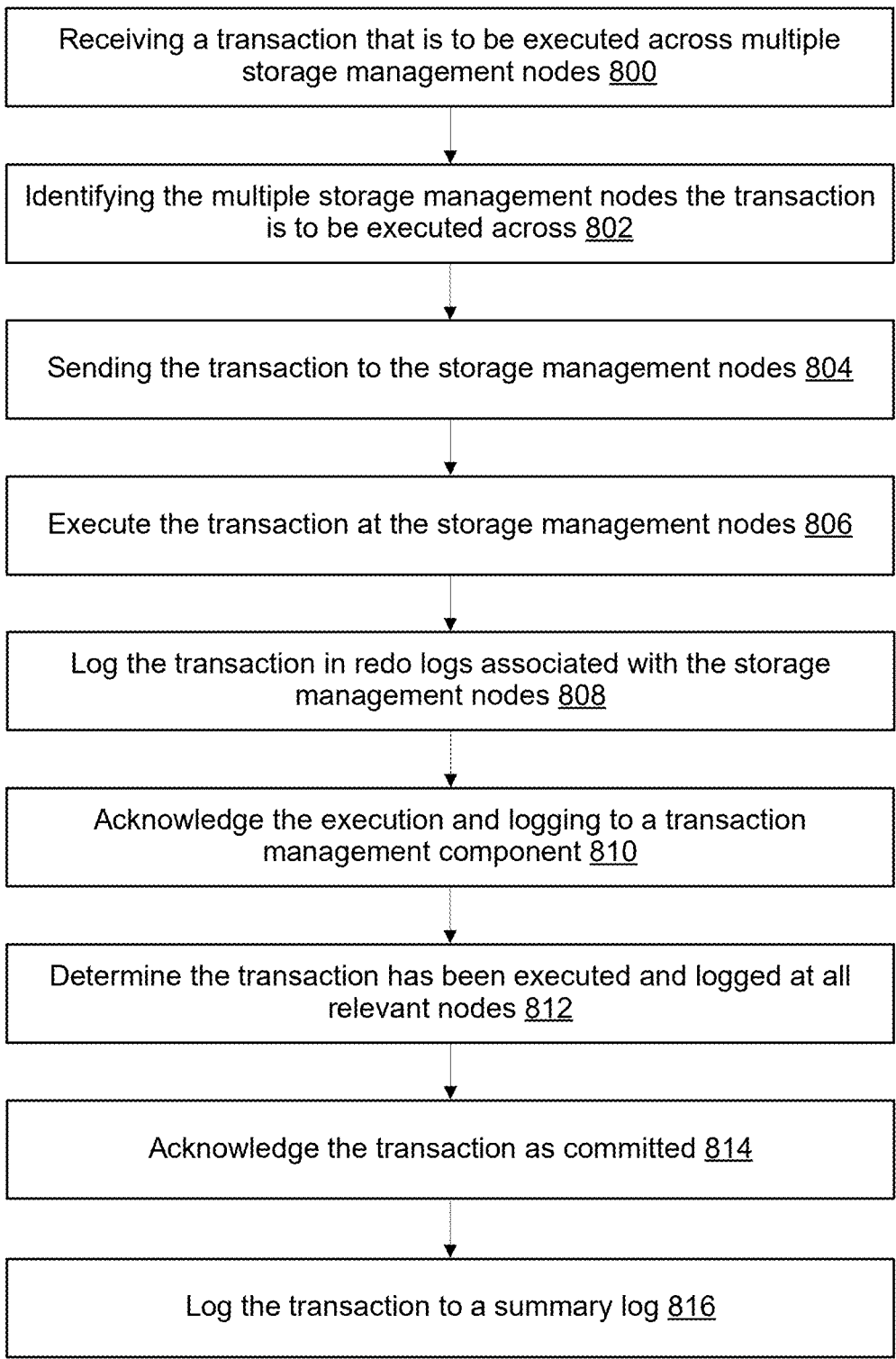

Receiving a transaction that is to be executed across multiple storage management nodes 800

Identifying the multiple storage management nodes the transaction is to be executed across 802

Sending the transaction to the storage management nodes 804

Execute the transaction at the storage management nodes 806

Log the transaction in redo logs associated with the storage management nodes 808

Acknowledge the execution and logging to a transaction management component 810

Determine the transaction has been executed and logged at all relevant nodes 812

Acknowledge the transaction as committed 814

Log the transaction to a summary log 816

FIG. 8

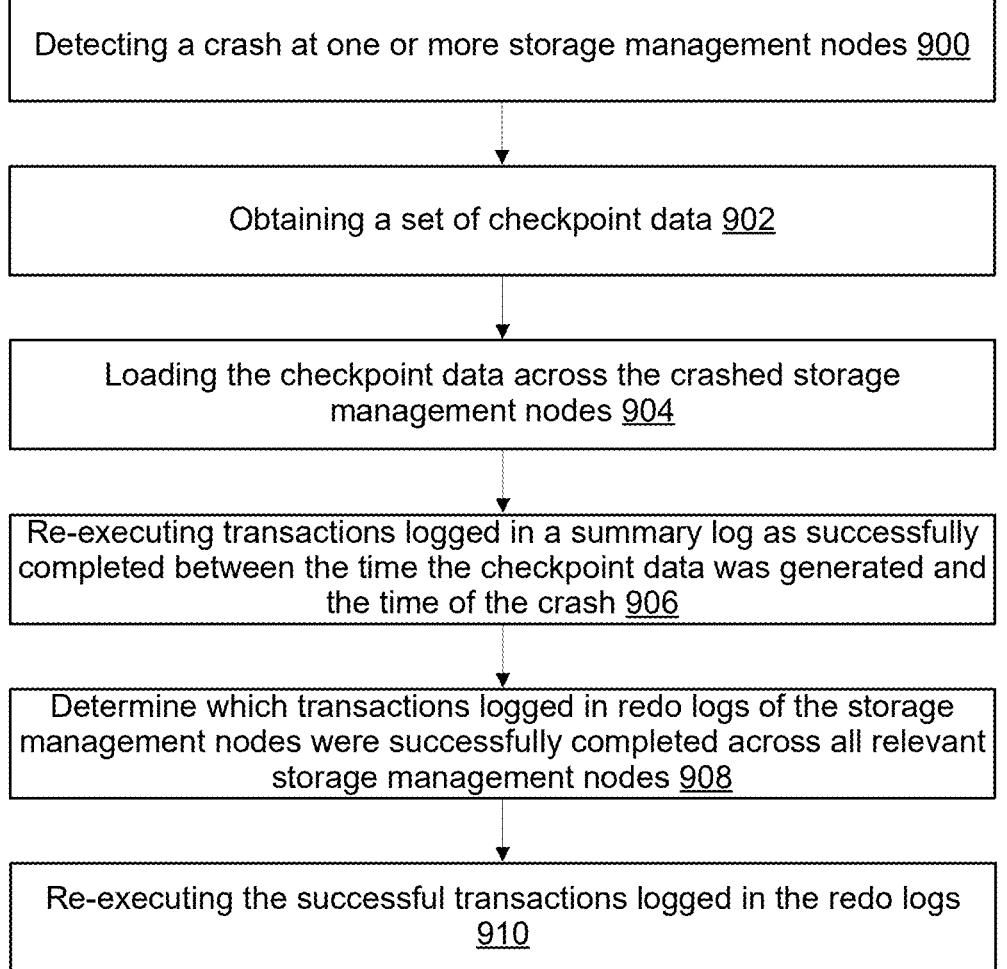

Detecting a crash at one or more storage management nodes 900

Obtaining a set of checkpoint data 902

Loading the checkpoint data across the crashed storage management nodes 904

Re-executing transactions logged in a summary log as successfully completed between the time the checkpoint data was generated and the time of the crash 906

Determine which transactions logged in redo logs of the storage management nodes were successfully completed across all relevant storage management nodes 908

Re-executing the successful transactions logged in the redo logs 910

FIG. 9

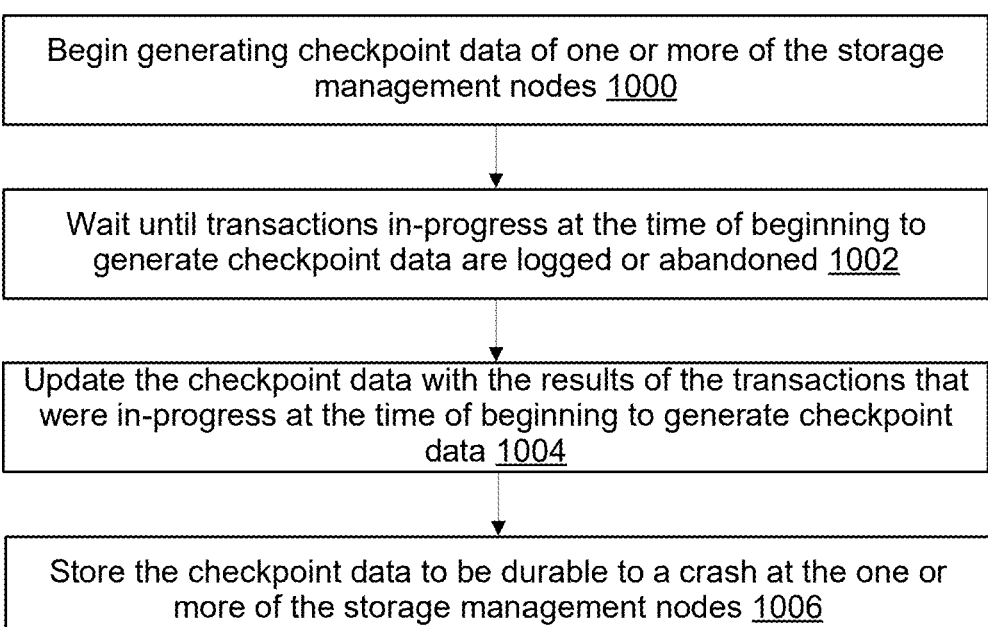

Begin generating checkpoint data of one or more of the storage management nodes 1000

Wait until transactions in-progress at the time of beginning to generate checkpoint data are logged or abandoned 1002

Update the checkpoint data with the results of the transactions that were in-progress at the time of beginning to generate checkpoint data 1004

Store the checkpoint data to be durable to a crash at the one or more of the storage management nodes 1006

FIG. 10A

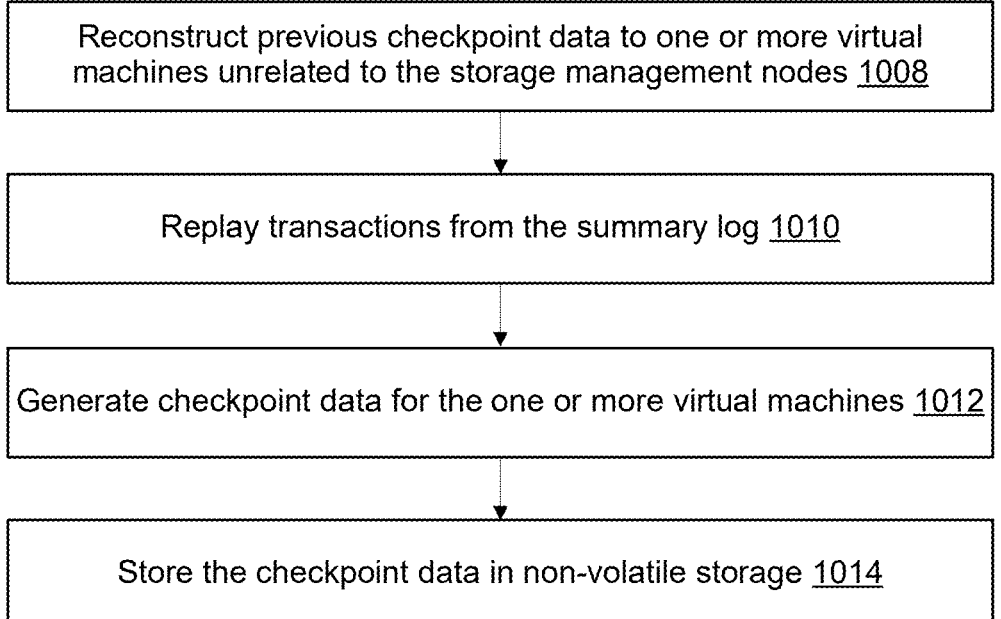

Reconstruct previous checkpoint data to one or more virtual machines unrelated to the storage management nodes 1008

Replay transactions from the summary log 1010

Generate checkpoint data for the one or more virtual machines 1012

Store the checkpoint data in non-volatile storage 1014

FIG. 10B

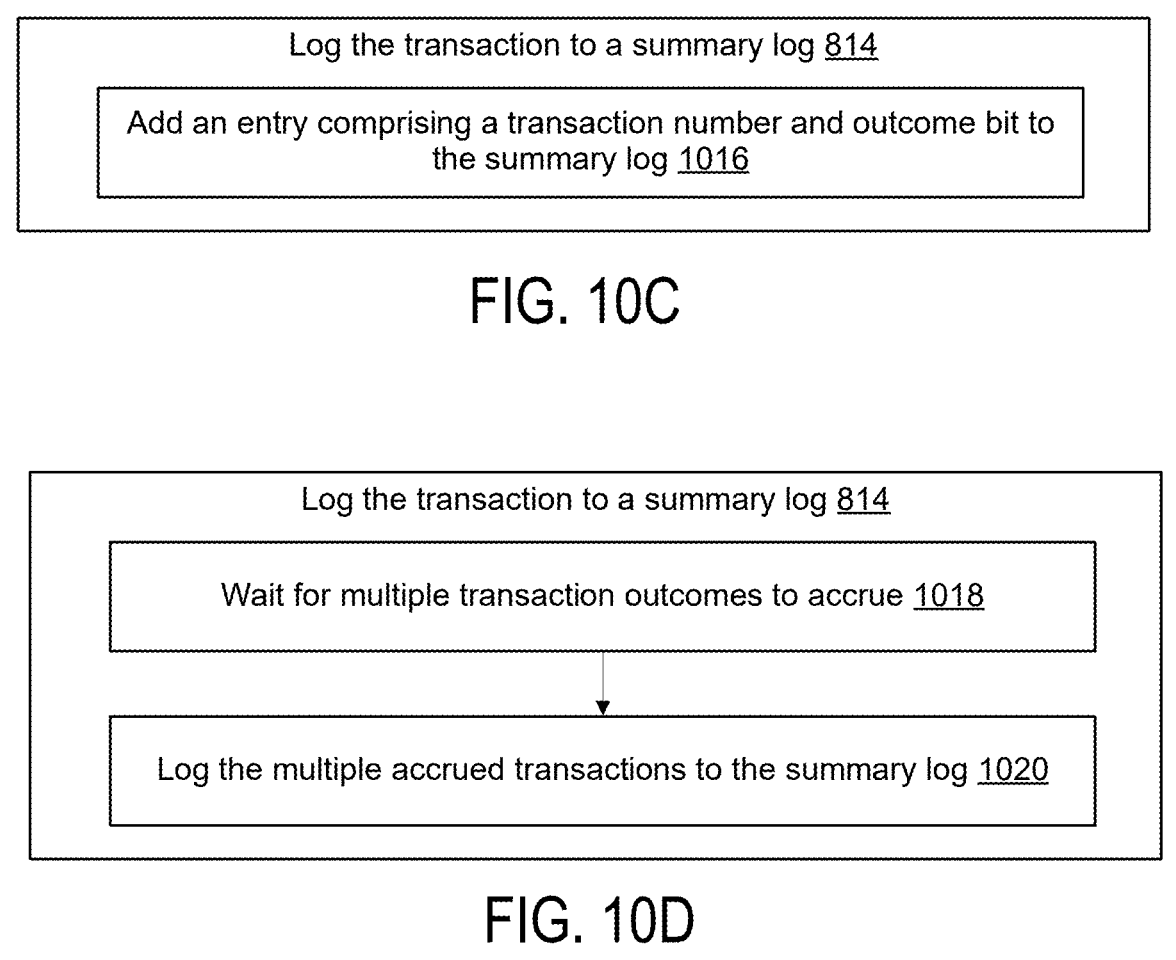

Log the transaction to a summary log <u>814</u>

> Add an entry comprising a transaction number and outcome bit to the summary log <u>1016</u>

FIG. 10C

Log the transaction to a summary log <u>814</u>

> Wait for multiple transaction outcomes to accrue <u>1018</u>
>
> Log the multiple accrued transactions to the summary log <u>1020</u>

FIG. 10D

DURABLE DATABASE LOG SYSTEM WITH LOW-LATENCY TRANSACTIONS STORED ACROSS MULTIPLE STORAGE NODES

BACKGROUND

Some database systems record recent transactions in a redo log. For example, the redo log may be stored in a distributed way that enables the redo log to survive a crash and be used to "re-do" transactions that have not otherwise been durably stored prior to the crash. However, recording a transaction to a redo log may slow the speed of transactions for large databases because all transactions to the database are processed into the single distributed redo log, which may become a bottleneck for executing transactions. Additionally, recording to a distributed redo log may cause additional time to elapse in processing a transaction as compared to other ways of committing a transaction, for example due to network latencies involved in recording the transaction at geographically distributed computing resources that collectively implement the distributed redo log and further waiting for write assurances from each of the distributed computing resources in order to ensure consistency.

BRIEF DESCRIPTION OF THE DRAWINGS

FIG. 5A is a block diagram illustrating components of an example entry of a transaction in a redo log, according to some embodiments.

FIG. 5B is a block diagram illustrating components of an example commit entry recorded in a redo log, according to some embodiments.

FIG. 5C is a block diagram illustrating example components of a transaction record for a transaction being processed at a transaction management component, according to some embodiments.

FIG. 5D is a block diagram illustrating example components of a summary entry recorded in a summary log and/or recorded in one or more redo logs of durable multi-log database system, according to some embodiments.

FIG. 8 is a flowchart illustrating a method performed at a durable multi-log database system supporting cross-node transactions with regard to a write transaction, according to some embodiments.

FIG. 9 is a flowchart illustrating a method of performing crash recovery for a durable multi-log database system supporting cross-node transactions, according to some embodiments.

FIG. 10A is a flowchart illustrating a method of generating checkpoint data for a durable multi-log database system supporting cross-node transactions, according to some embodiments.

FIG. 10B is a flowchart illustrating a method of updating checkpoint data using partial recovery, according to some embodiments.

FIG. 10C is a flowchart illustrating a method of adding an entry to a summary log of a durable multi-log database system supporting cross-node transactions, according to some embodiments.

FIG. 10D is a flowchart illustrating a method of logging information in an added entry of the summary log, according to some embodiments.

Figure 1:
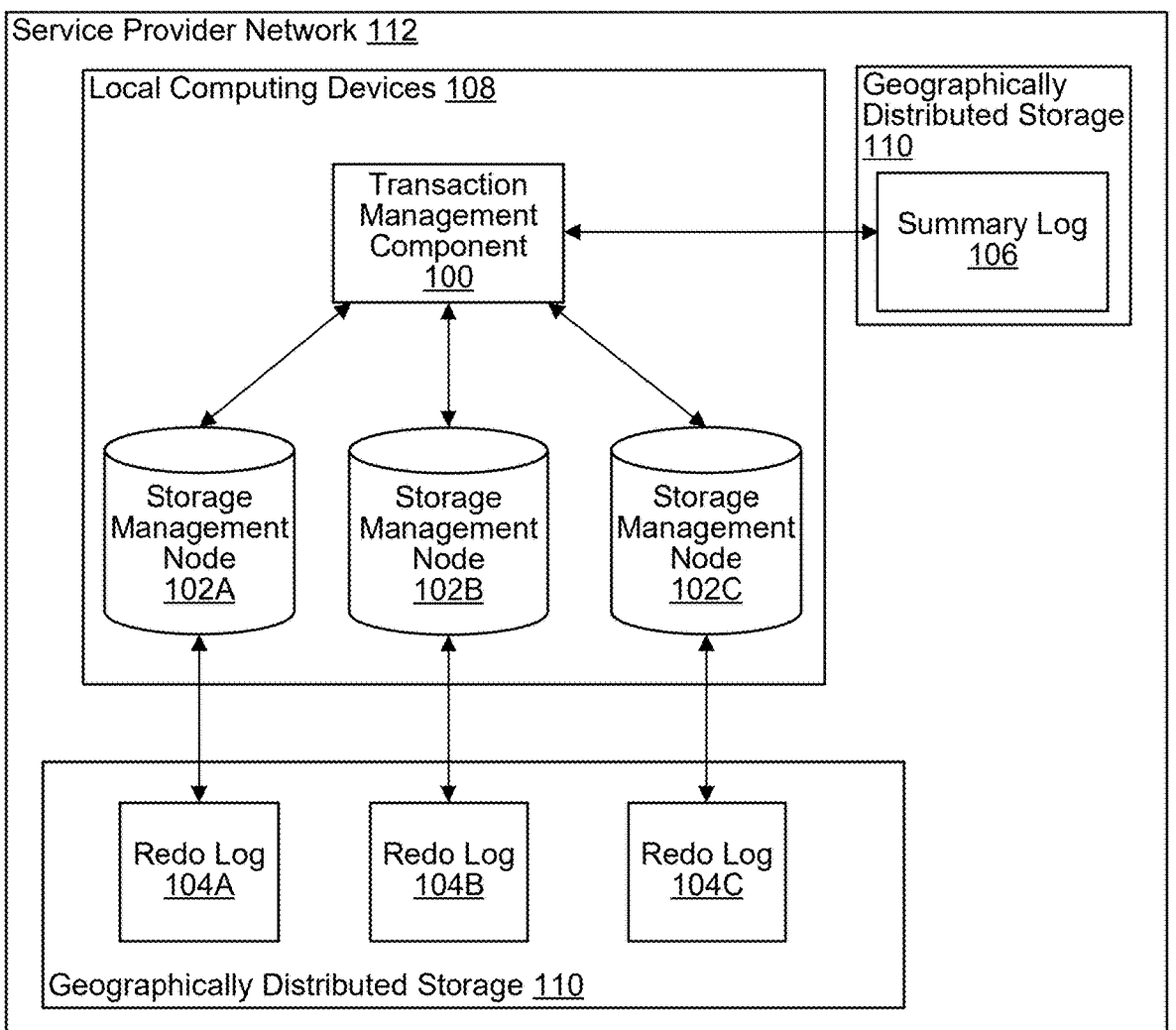
FIG. 1 illustrates a durable multi-log database system supporting cross-node transactions, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

In some embodiments, a database may be implemented using a multi-log durability system that logs transactions to redo logs for durability in the event of a crash, such as a crash at local computing devices providing storage management and/or maintaining an in-memory version of at least a portion of the database. For example, the use of multiple redo logs may ensure durability due to each of the redo logs having independent failure mechanisms from one another and also independent failure mechanisms from the local computing devices performing storage management and/or maintaining the in-memory version of at least a portion of the database. In some embodiments, the database may further enable execution of transactions that mutate data stored across multiple partitions of the database, wherein different partitions are managed by different local computing devices having different associated redo logs. A transaction management component may ensure an entire transaction has committed across the relevant portions of the database and log the fact the transaction has committed at a summary log. The summary log may be stored similarly to the redo logs to be durable in the event of a crash.

A database using multiple redo logs may commit transactions quicker than a database using a single log by reducing the likelihood of a bottleneck during logging. A multi-log durability system may further be improved by using a summary log to perform recovery from a crash quicker than a multi-log durability system not using a summary log. For example, the use of a summary log may reduce the complexity of recovery for some transactions by providing a single source of summarized records, as opposed to needing to compare records stored across multiple separate redo logs.

A transaction management component may cause a transaction to be committed in a multi-log durability system. For example, the transaction management component may initiate a commitment process for the transaction at a set of storage management nodes, each having associated redo logs, and the transaction management component may further be responsible for acknowledging a commitment of the transaction to a requesting client, in response to determining the transaction has been durably stored in the multi-log durability system. More specifically, the transaction management component may receive the transaction, identify the storage management nodes the transaction is to be stored across, and send the transaction to the identified storage management nodes to be committed. In response, the storage management nodes may each attempt to commit the transaction and log at the respective redo logs of the respective storage management nodes whether the transaction successfully committed. The transaction management component may receive acknowledgments from the storage management nodes that the transaction successfully committed at the relevant redo logs associated with the storage management nodes or did not successfully commit at one or more of the relevant redo logs associated with the storage management nodes.

The transaction management component may further summarize the acknowledgments into a general success outcome for the transaction, which the transaction management component may report to a user and log at the summary log. The transaction management component may also provide the general success outcome for the transaction to the respective storage management nodes for logging at one or more of the redo logs associated with the respective storage management nodes. The general success outcome, which may also be called a summary acknowledgement, can be logged with a delay from reporting the outcome to a user, because the information included in the general success outcome can be obtained from the combination of the redo logs. For example, the transaction management component may proceed to provide a transaction commitment acknowledgment to a requesting client upon receiving a full set of acknowledgements from a set of storage management nodes, indicating that the transaction has been written in each of the logs associated with the set of storage management nodes, without needing to wait for a further acknowledgement from the summary log indicating that the summary acknowledgement has been written to the summary log.

After a crash occurs, the transaction management component may restore the database to a state of the database prior to the crash. Each of the storage management nodes may load checkpoint data that was generated based on the database before the crash. The transaction management component may replay transactions that committed after the checkpoint data was generated and before the storage management nodes crashed by replaying the transactions logged at the summary log and replaying the transactions logged the relevant redo logs associated with the storage management nodes. The entries in the summary log and the redo logs indicate whether respective ones of the transactions previously received were successfully committed. Data for the transactions may be stored in the redo logs. The transaction management component replays the transactions that were previously successfully committed to restore the database to the state of the database immediately prior to the crash, with regard to transactions that have been reported as committed to a user. However, at least some transactions in progress at the time of the crash may not have been committed, and therefore should not be replayed to the current state of the database.

Following a crash, the transaction management component of a multi-log durability system accesses the checkpoint data, the summary log, and the multiple redo logs. The checkpoint data, summary log, and multiple redo logs are stored to be durable to a crash at the storage nodes. The checkpoint data, summary log, and multiple redo logs may be durably stored by being stored in non-volatile storage, by being stored in multiple availability zones, or by another durable storage method. An availability zone may be a geographical area comprising one or more databases. Weather conditions and electrical grid activity at one availability zone may not impact the weather conditions and electrical grid activity at another availability zone.

Transactions that are committed across nodes may depend on being successfully committed at all relevant nodes for the data included in the transaction to be considered "committed' and therefore available to later be read. In some embodiments, transactions that involve commitments across nodes may occur, for example, in databases with interconnected data. As a specific example, in some embodiments, graph databases implemented using a multi-log durability system may include transactions that require multiple commitments across nodes. For example, in some embodiments, storage management nodes may each maintain portions of a graph database that are impacted by an individual transaction, wherein changes to one of the portions of the graph database affects the other portion of the graph database.

In some embodiments, a storage management node corresponds to a single partition and has a single associated redo log. However, in some embodiments, a storage management node may manage multiple partitions of the database. In such embodiments, the multiple partition may each have their own associated redo log or separate redo logs. Storage management nodes may also implement in-memory representations of partitions which may be vulnerable to crashes at particular computing devices.

FIG. 1 illustrates a durable multi-log database system supporting cross-node transactions, according to some embodiments.

A durable multi-log database system supporting cross-node transactions may be implemented in a service provider network 112. The service provider network 112 may include local computing devices 108 and geographically distributed storage 110. Geographically distributed storage 110 may be used to durably store information so that the information is available in the event of a crash at the local computing devices 108. Information logged at a redo log 104 or a summary log 106 is durably committed because the information is stored at geographically distributed storage 110. There may be multiple copies of the redo logs 104 and summary log 106, which may be hosted in multiple availability zones.

The durable multi-log database system may require more time to make changes at a geographically distributed storage 110 than at local computing devices 108. For example, the local computing devices 108 may be implemented using one or more computing resources in a same data center, whereas the geographically distributed storage may be implemented using computing resources at different data centers that are connected to one another via service provider network 112. In some embodiments, local computing devices 108 may include computing instances (e.g. virtual machines) that implement the respective storage management nodes 102A-102C. In some embodiments, the computing instances implementing the storage management nodes 102A-102C may be computing instances of different computing hosts located in a common availability zone or even a common data center. Including the transaction management component 100 and the storage management nodes 102A-102C in a common (e.g. local) location may reduce network latencies between the respective components. However, to avoid data loss, the associated redo logs 104A-104C may be implemented using geographically distributed storage 110. For example, geographically distributed storage 110 includes storage devices located in different data centers and/or availability zones of service provider network 112. In some embodiments, one of the distributed geographic locations used to implement geographically distributed storage 110 may be the common availability zone and/or the common data center hosting local computing devices 108, but other ones of the distributed geographic locations used to implement geographically distributed storage 110 include other data centers and/or availability zones that are distinct from the data center or availability zone hosting local computing devices 108.

The local computing devices 108 may host a transaction management component 100 and storage management nodes 102. The transaction management component 100 may be responsible for causing transactions to be executed on the database and guaranteeing that the transactions are durably stored before providing a commitment acknowledgment to a requesting client. Ensuing durable storage of transactions prior to acknowledging commitment may ensure that the database can be reconstructed with the committed transactions in the event of a crash at the local computing devices 108. The transaction management component 100 may include multiple managerial components that are able to communicate actions and decisions with each other. The storage management nodes 102 may include partitions which represent portions of the database, and the storage management nodes 102 may communicate with the redo logs 104 to record transactions for partitions of the database that the respective storage management nodes are responsible for maintaining. The redo logs 104 may log transactions that are successfully committed on partitions managed by the storage management nodes 102 that are associated with the respective redo logs 104. For example, storage management node 102A may successfully commit a transaction on a partition managed by storage management node 102A. Redo log 104A may log the transaction. Redo log 104A may then acknowledge the transaction to transaction management component 100 as being committed in the partition managed by storage management node 102A. Also, in some embodiments, redo log 104A may provide the acknowledgment to storage management node 102A, which in turn provides an indication to transaction management component 100 that the transaction has been locally committed at storage management node 102A.

A single transaction may be distributed over multiple partitions, which may be managed by different respective ones of storage management nodes 102A-102C. For example, a particular transaction may be distributed across three different partitions which are managed by storage management node 102A, storage management node 102B, and storage management node 102C. (It should be noted that three storage management nodes are given as an example for ease of illustration, but in some embodiments various other combinations of storage management nodes may be affected by a given transaction). Storage management node 102A, storage management node 102B, and storage management node 102C may each attempt to execute the transaction. Redo log 104A, redo log 104B, and redo log 104C may all log the respective outcomes of the attempted executions and report the outcomes to the transaction management component 100 as acknowledgements, and/or the acknowledgements may be routed back through the respective storage management nodes 102A-102C to the transaction management component 100.

The transaction management component 100 may receive the acknowledgements and determine whether the transaction successfully committed at all three relevant storage management nodes 102. (Note that other number of storage management nodes may be affected in other situations). If the transaction successfully committed, the transaction management component 100 may generate a summary acknowledgement indicating that the transaction committed to the relevant redo logs 104. If the transaction failed at one or more of the storage management nodes 102, the transaction management component 100 may generate a summary acknowledgement to the effect that the transaction is aborted to the relevant storage management nodes 102. The storage management nodes 102 may maintain internal undo logs, which the storage management nodes 102 may use to undo a transaction that failed to commit at another relevant storage management node 102. For example, if a transaction fails to commit at storage management node 102C, the transaction management component 100 may indicate to storage management node 102A and storage management node 102B not to commit the transaction or to undo the transaction if it is already committed. The transaction management component 100 may assign transaction identifiers so the transaction management component 100 can communicate with the storage management nodes 102 about particular transactions.

The transaction management component 100 may report the summary acknowledgement to the user (e.g. transaction requesting client) as an indication that the user's transaction has been committed in the database. At the time the transaction management component 100 receives an acknowledgement from each relevant redo log 104, the transaction is durably stored because there is an outcome for the transaction logged in each relevant redo log 104. At this point, the transaction management component may proceed to provide the summary acknowledgement (e.g., commitment) to the user (e.g. requesting client). The transaction management component 100 may further cause the summary acknowledgement to be logged at a summary log 106 or optionally at one or more redo log 104. However, the transaction component may provide the summary acknowledgment (e.g., commitment) to the user (e.g. requesting client) without waiting for the summary acknowledgement to be written at a log. Logging the summary acknowledgement may increase the speed of recovery by decreasing the amount of work the transaction management component 100 has to do in the event of recovery.

As mentioned above, the transaction management component 100 does not need to log the summary acknowledgement in order to send a report to the user that a transaction is durably committed. A transaction management component 100 may send a report to the user that a transaction is durably committed before the summary acknowledgment is logged, independent of the summary acknowledgment being logged, or despite the summary acknowledgment failing to be logged. For example, if a transaction was successfully committed in each of redo logs 104A, 104B, and 104C, but the local computing devices 108 crashed before a summary acknowledgment could be written to one or more of the redo logs 104A-104C and/or the summary log 106, the transaction would nevertheless be committed and could safely be indicated to the user (e.g., requesting client) as committed. As further explained below, in such situations in which summary acknowledgements are not recorded, the transaction management component 100 evaluates such transaction for replay in crash recovery and only replays transactions for which a full set of redo logs indicate the transaction was logged. Note that in the above examples, a cluster size of the redo logs that record a given transaction is given as three for ease of illustration. However, in some embodiments, various other cluster sizes could be used, such as 2, 4, 5, etc.

Figure 2:
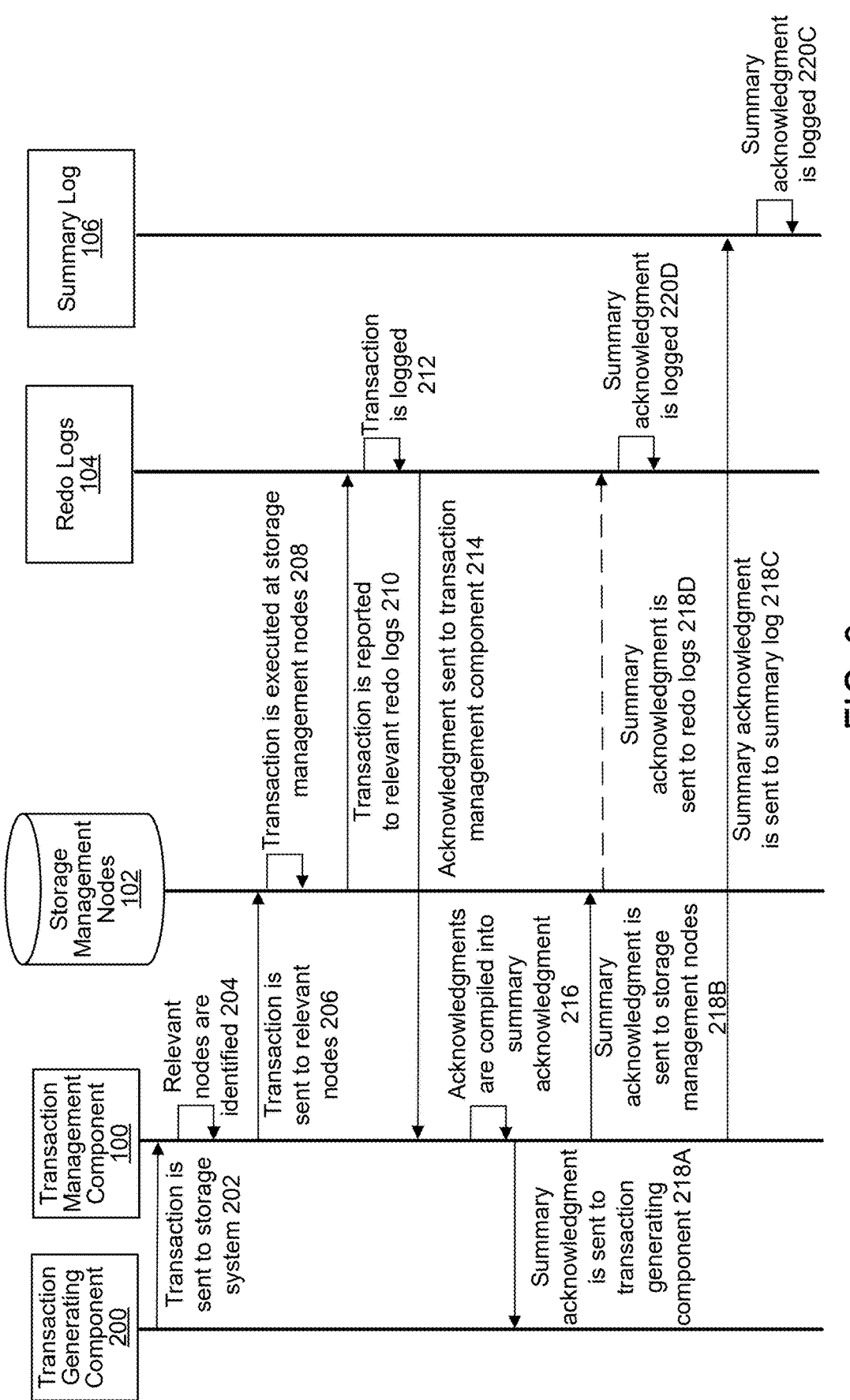
FIG. 2 illustrates a flow of information in a durable multi-log database system supporting cross-node transactions, for example with regard to a write transaction, according to some embodiments.

FIG. 2 illustrates a flow of information in a durable multi-log database system supporting cross-node transactions, for example with regard to a write transaction, according to some embodiments.

A transaction generating component 200 (e.g., requesting client or user) may generate a transaction that is to be committed at the database. The transaction generating component 200 may, at 202, send the transaction to the durable multi-log database system. The transaction management component 100 may receive the transaction and, at 204, identify the relevant storage management nodes 102 for processing the transaction. The transaction management component may, at 206, send the transaction to the relevant storage management nodes 102.

The storage management nodes 102 may, at 208, execute the transaction. The storage management nodes 102 may, at 210, report the success or failure of the transaction execution to the redo logs 104 associated with the storage management nodes 102. The redo logs 104 may, at 212, log the success or failure of the transaction execution. The redo logs 104 may also, at 214, send an acknowledgement of the transaction, including the success or failure of the transaction execution, to the transaction management component 100 (or alternatively route the indication of success or failure to the transaction management component via the respective storage management nodes). The transaction management component 100 may receive the acknowledgements from all the relevant redo logs 104 and may, at 216, compile the acknowledgements into a collective summary acknowledgement.

The summary acknowledgement may describe whether the transaction as a whole was successfully committed and may depend on a number of acknowledgments from the relevant redo logs 104 indicating that the transaction was successfully committed. For example, if the transaction was distributed to N redo logs, acknowledgments from all N redo logs may be needed to consider the transaction successfully committed. At 216, successful transactions are considered durably committed due to receiving confirmation that the logs at the redo logs 104 that were made at 212 were successfully committed at the respective redo logs 104. A durable multi-log database system may use a summary acknowledgement (or failure) for informing storage management nodes 102 that did not report a failure that a transaction has failed, for reporting to a user that the transaction is durably committed, and for speeding the process of recovery. A transaction management component 100 may, at 218A, send a summary acknowledgement, or an indication of failure, to a storage management node 102, which may inform the storage management node of whether an executed transaction is committed. The summary management node 102 may optionally at 218D send the summary acknowledgement to a redo log 104, which may log the summary acknowledgment at 220D. The transaction management component 100 may, in any order, at 218A send the summary acknowledgement (or failure) to the transaction generating component 200 and at 218C send the summary acknowledgement (or failure) to the summary log 106. The summary log 106 may, at 220C, log the summary acknowledgement. In some embodiments, the durable multi-log database system may use one redo log 104 of the multiple redo logs 104 as the summary log.

A durable multi-log database system may have improved write latencies as compared to other systems due to the transaction management component 100 quickly sending the summary acknowledgment to the transaction generating component (218A), without waiting for the summary acknowledgement to be written at the respective redo logs 104 and/or the summary log 106. Also, a durable multi-log database system may speed recovery due to the transaction management component 100 sending the summary acknowledgment to the redo logs 104 (218D) or the summary log 106 (218C). For example, for transactions that have a summary acknowledgment written to the redo logs 104 or the summary log 106, the steps of verifying N copies of the transaction were recorded in the respective redo logs may be skipped in the recovery process. This is because the summary acknowledgement is only generated when the transaction management component confirms that the full N number of copies were recorded in the respective redo logs. A durable multi-log database system may be able to delay sending the summary acknowledgement to the summary log 106 (218C) without risk of losing data.

Figure 3:
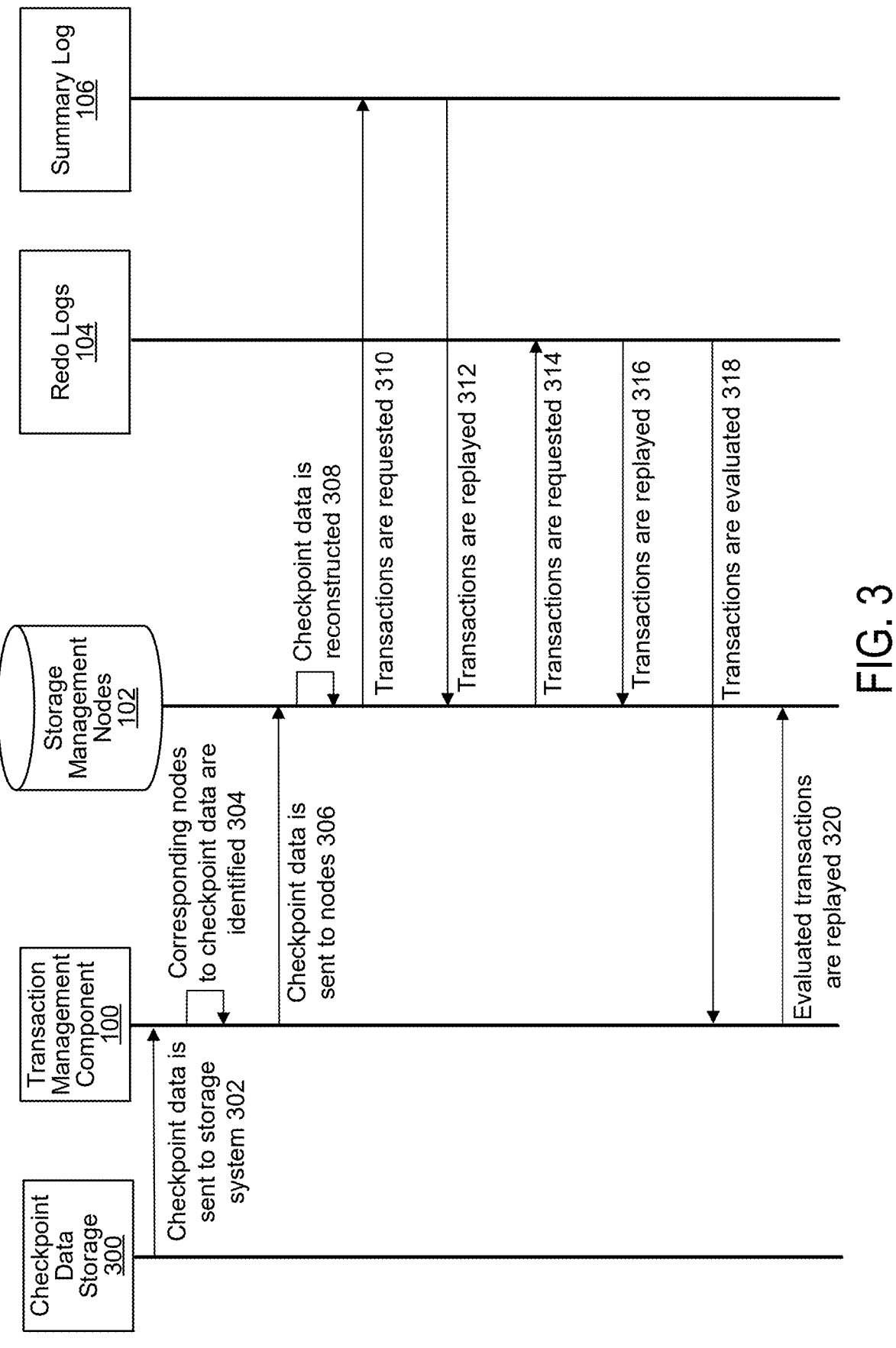
FIG. 3 illustrates a flow of information for a durable multi-log database system supporting cross-node transactions during a recovery process, according to some embodiments.

FIG. 3 illustrates a flow of information for a durable multi-log database system supporting cross-node transactions during a recovery process, according to some embodiments.

In the event of a crash at one or more of the storage management nodes 102, the multi-log durability system may begin a recovery process. The transaction management component 100 may request checkpoint data from a checkpoint data storage 300. The checkpoint data storage 300 may, at 302, send the checkpoint data to the multi-log database system. For example, the checkpoint data for each respective storage management node affected by the crash may be sent to respective affected storage management nodes from checkpoint data storage 300. The transaction management component 100 may, at 304, identify corresponding crashed storage management nodes 102 to receive the checkpoint data. The transaction management component 100 may, at 306, send the checkpoint data to the crashed storage management nodes. The storage management nodes 102, at 308, may reconstruct the database from the checkpoint data.

The storage management nodes 102 may, at 310, request transactions that have been successfully committed since the time the checkpoint data was captured from the summary log. The summary log 106 may respond with the transactions that have successfully been committed between the time the checkpoint data was captured and the crash, and the storage management nodes 102 may at 312 replay those transactions. In some embodiments, the transactions may be recorded at the redo logs 104, and the storage management nodes 102 may use the information from the summary log 106 to verify which transactions to replay from the redo logs 104.

However, the summary log 106 may not contain all transactions that have been committed prior to the crash. For example, some transactions may have been committed at each of the redo logs 104, but not yet had a summary acknowledgement written to the summary log 106. The storage management node 102 may, at 314, request transactions that have successfully committed prior to the crash from the redo logs 104 corresponding to the storage management nodes 102. The redo logs 104 may respond with logged summary acknowledgements, if any are available at the redo logs 104, and logged acknowledgements. The redo log 104 may also send the logged acknowledgements to the transaction management component 100.

The storage management node 102 may, at 316, replay the logged summary acknowledgements and may replay or delay replaying the logged acknowledgements. Recall that the logged summary acknowledgments represent committed transactions because the summary acknowledgement is only generated when all "N" redo logs of a cluster successfully log a given transaction. Thus, the presence of a summary acknowledgment in at least one of the redo logs for a given transaction can be used as a marker that the transaction successfully committed and should be replayed. However, for a transaction for which acknowledgements were written in the redo logs but for which a summary acknowledgment was not written, the transaction management component verifies that all "N" redo logs of the cluster recorded the transaction in order to consider the transaction committed. Recall that in recovery, only committed transactions are replayed. Thus, transactions for which less than the full set of "N" redo logs of the cluster indicate acknowledgments, these transactions are not considered committed and therefore are not replayed. The transaction management component 100 may, at 318, evaluate the logged acknowledgements by checking whether the particular transactions committed at the other relevant storage management nodes 102 and redo logs 104 prior to the crash. The transaction management component 100 may, at 320, report the results of the evaluation to the storage management component 102 so the storage management component 102 can either proceed to replay the successful transactions or undo the previously replayed failed transactions.

Figures 4A, 4B:
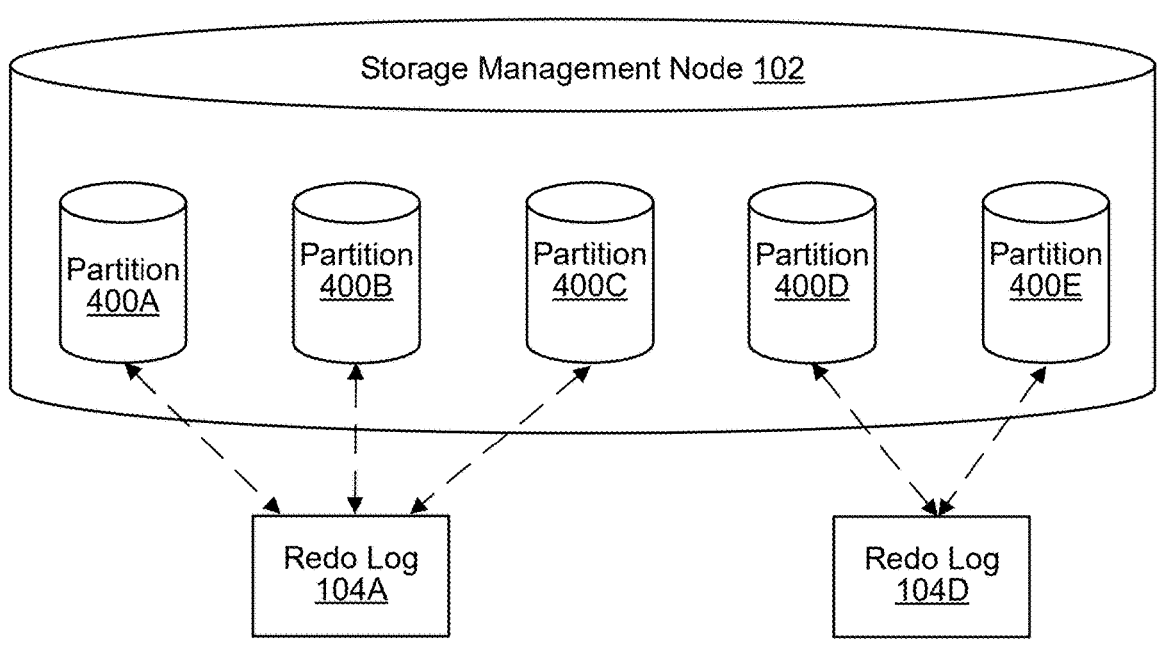
FIG. 4A is a block diagram illustrating a group of partitions of a storage management node, according to some embodiments.
FIG. 4B is a block diagram illustrating geographically distributed availability zones comprising computing resources used to implement a durable multi-log database system supporting cross-node transactions, according to some embodiments.

FIG. 4A is a block diagram of a group of partitions of a storage management node, according to some embodiments.

A storage management node 102 may comprise one or more partitions 400, which may be responsible for maintaining portions of the database. The partitions 400 managed by a single storage management node 102, such as partition 400A, partition 400B, and partition 400C, may share a redo log 104A. In some embodiments a single management node 102 may correspond to a single redo log 104. In some embodiments, a storage management node 102 may correspond to multiple redo logs 104, such as redo log 104A and redo log 104D. A redo log, such as redo log 104A, may correspond to a different number of partitions 400 than another redo log, such as redo log 104D. Redo log 104A may correspond to three partitions 400 or another number of partitions, such as partition 400A, partition 400B, and partition 400C and redo log 104D may correspond to two partitions 400 or another number of partitions, such as partition 400D and partition 400E.

FIG. 4B is a block diagram illustrating geographically distributed availability zones comprising computing resources used to implement a durable multi-log database system supporting cross-node transactions, according to some embodiments.

An availability zone may be a geographical area that has independent conditions from other availability zones, for example, an availability zone affected by a thunderstorm may be on a separate electrical grid from another availability zone, so that the thunderstorm affecting the availability zone is unlikely to cause a power outage at the other availability zone.

The first availability zone 402 shown in FIG. 4B includes datacenter 408A and datacenter 408B. An availability zone may include multiple datacenters 408. In this illustration, datacenter 408A hosts local computing devices 108 which implement the transaction management component and the storage management nodes for the database. Datacenter 408B may host a copy of at least some of the redo logs 104 for the database. A condition that affects datacenter 408A may also affect datacenter 408B. In some embodiments, including a copy of redo log 104 in datacenter 408C may better ensure durability, because datacenter 408B is in first availability zone 402, which is the same availability zone as the datacenter 408A hosting the local computing devices 108 which maintain the database, and datacenter 408C is in a different availability zone.

Datacenter 408C, located in second availability zone 404, may host a copy of the redo logs 104 for the database. Because datacenter 408C is not located in first availability zone 402, datacenter 408C may be less likely to be affected by conditions that affect datacenter 408A, and more likely to be durable in the event of a crash at datacenter 408A.

A durable multi-log database system may further increase durability by storing an additional copy of a redo log 104 in a datacenter 408D in a third availability zone 406. The likelihood of a simultaneous crash of the redo log 104 across datacenters 408 may be reduced by increasing the number of availability zones which include a datacenter 408 storing a copy of the redo log 104.

FIG. 5A is a block diagram illustrating components of an example entry of a transaction in a redo log, according to some embodiments.

In some embodiments, a durable multi-log system may store data for a transaction 502 at a redo log. Storing the transaction 502 at the redo log may ensure the transaction 502 is able to be replayed in the event of a crash at the database. The entry for the transaction 502 may also include a transaction identifier 500. In some embodiments, the transaction identifier 500 may be a temporary transaction identifier, which may be used to label a transaction 502 that is in the process of being committed.

FIG. 5B is a block diagram illustrating components of an example commit entry recorded in a redo log, according to some embodiments.

An entry at a redo log may include a transaction identifier 500, a secondary transaction identifier 504, an indication 506 of whether the transaction (502) successfully committed at the redo log associated with that entry, and a total number of relevant redo logs the transaction is to be written across 508. A durable multi-log database system may track a transaction 502 using a transaction identifier 500. In some embodiments the transaction identifier 500 may be associated with a secondary transaction identifier 504, which may be a permanent transaction identifier, for example, a transaction sequence number. A transaction 502 may be included in the redo log commit entry in some embodiments.

The indication 506 of whether the transaction (502) was successfully committed at the redo log may be a single bit indicating success or failure, and may be optional due to the existence of the commit entry implying success. The total number of redo logs 508 may be a count of the total number of relevant redo logs the transaction 502 commits across. In some embodiments, the total number of redo logs 508 may be excluded from the redo log commit entry because this number is a constant or is able to be determined from another source which is durable to a crash that would require the multi-log durability system to perform recovery. For example, in some systems each transaction 502 may be written to pre-determined number of redo logs, in which case it may not be necessary to record the number of affected redo logs in a log entry.

FIG. 5C is a block diagram illustrating example components of a transaction record for a transaction being processed at a transaction management component, according to some embodiments.

A transaction management component may track which redo logs are relevant to the transaction and the acknowledgements that are received from the redo logs. The transaction management component may record the transaction identifier 500 or secondary transaction identifier 504, which may be a permanent transaction identifier 500 at the time the transaction management component approves the transaction 502 for attempted execution at the storage management nodes. The transaction management component may record the transaction 502 in some embodiments. Note that in some embodiments, a permanent transaction identifier may be issued in addition to a temporary transaction identifier, and may be used for tracking a transaction that is to be committed, and the temporary transaction identifier may be used to track transactions not yet determined to be eligible to be committed.

The transaction management component may record the number of redo logs 510 involved in committing the transaction (502) to check whether the transaction 502 has been acknowledged from the expected number of storage management nodes/redo logs. The transaction management component may record the acknowledgments received from the redo logs, such as acknowledgement from first redo log 512 and acknowledgement from second redo log 514, etc. These acknowledgements may be single bits indicating success or failure, and may correspond to the success outcome (506) portion of a redo log entry.

The transaction management component may also track whether the transaction (502) has been logged to a summary log 516. A transaction management component may update the summary log in batches of transactions 502.

FIG. 5D is a block diagram illustrating example components of a summary entry recorded in a summary log and/or recorded in one or more redo logs of durable multi-log database system, according to some embodiments.

The transaction management component may generate a summary entry including a summary acknowledgment 518 based on the acknowledgements received from the redo logs. The summary entry may include a transaction identifier 500 or secondary transaction identifier 504 and in some embodiments the summary entry may include the transaction 502. The summary entry may not include the transaction 502 if the transaction 502 is durably accessible from another source in the event of a crash, such as being included in a redo log entry or a durably stored snapshot. The summary acknowledgement 518 may be a single bit indicating whether the transaction as a whole succeeded or failed to be committed. The summary acknowledgement 518 may indicate whether to replay the transaction 502 or skip the transaction 502 during recovery. The summary acknowledgement 518 may be reported to a requesting client prior to being logged at a summary log.

Figure 6:
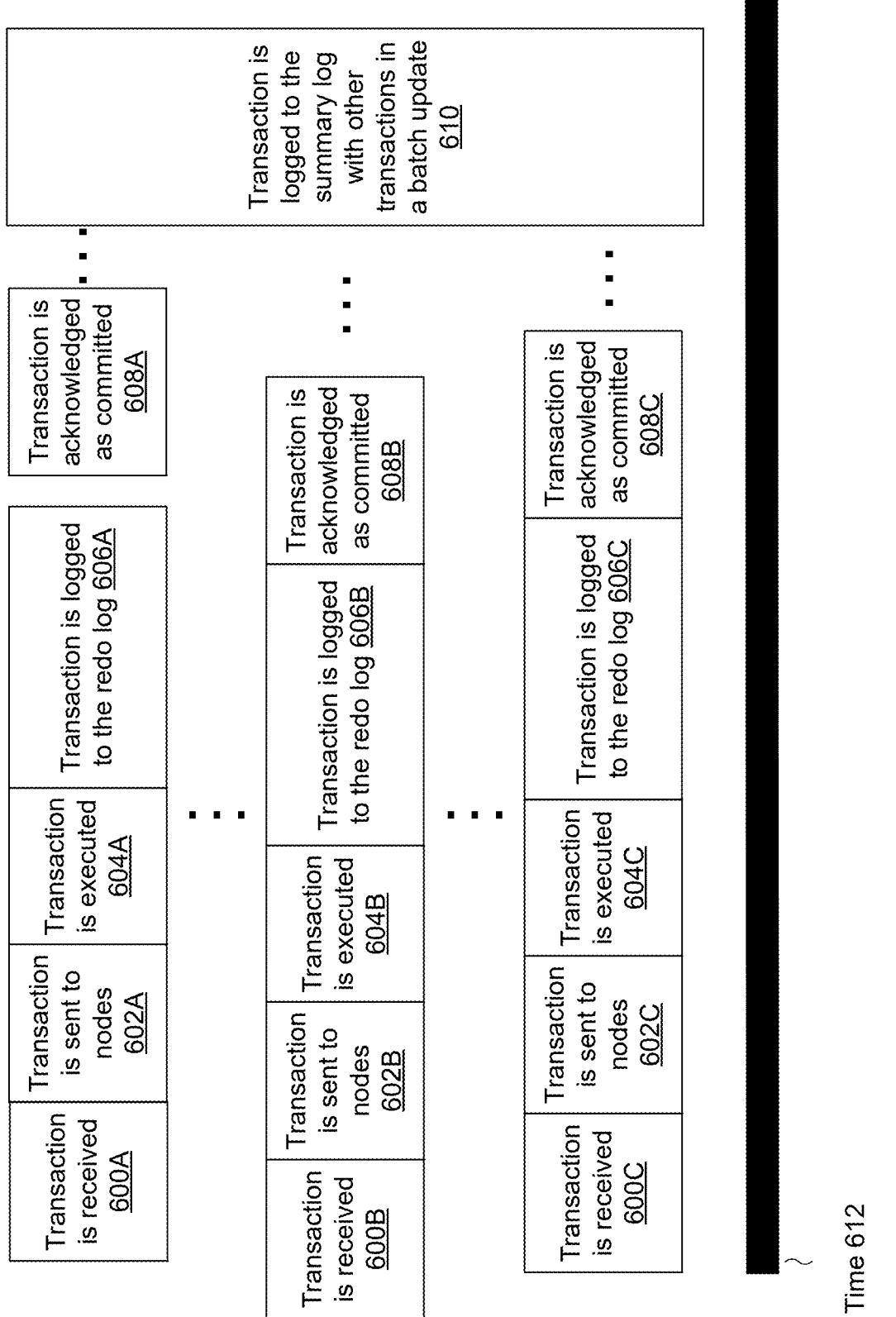
FIG. 6 illustrates time sequencing of transactions processed at a durable multi-log database system supporting cross-node transactions, according to some embodiments.

FIG. 6 illustrates time sequencing of transactions processed at a durable multi-log database system supporting cross-node transactions, according to some embodiments.

The timeline 612 shows the activity of three transactions, corresponding to A, B, and C. The transactions may be processed in any order, and transactions may be processed in a parallel or apparently first in first out order as illustrated, although these ordering methods are not required. Transactions A and C are received by the transaction management component, at 600A and 600C, after transaction B is received by the transaction management component at 600B. Any individual transaction, after being received by the transaction management component, is sent to the storage management nodes at 602. The storage management nodes attempt to execute the transaction at 604, then acknowledge the result of the attempted execution, e.g. acknowledge whether the transaction was written to the redo log. The redo log also logs the result of the attempted execution of the transaction at 606.

The durable multi-log database system may implement an order to the transactions. As illustrated, the transaction management component may refuse transaction acknowledgments in parallel and may implement an order at the acknowledgement step 608. In this example, the order is 608B, 608C, and 608A. The acknowledgement step 608 order may not correspond to the order transactions were received. Permanent transaction identifiers may correspond to the acknowledgement step 608 order or the logging step 606 order. The transaction management component may send acknowledgements to the user regarding the success of the transactions at step 608.

The transaction management component may delay logging transactions at the summary log in order to log many transactions in a batch update to the summary log at step 610.

Figure 7:
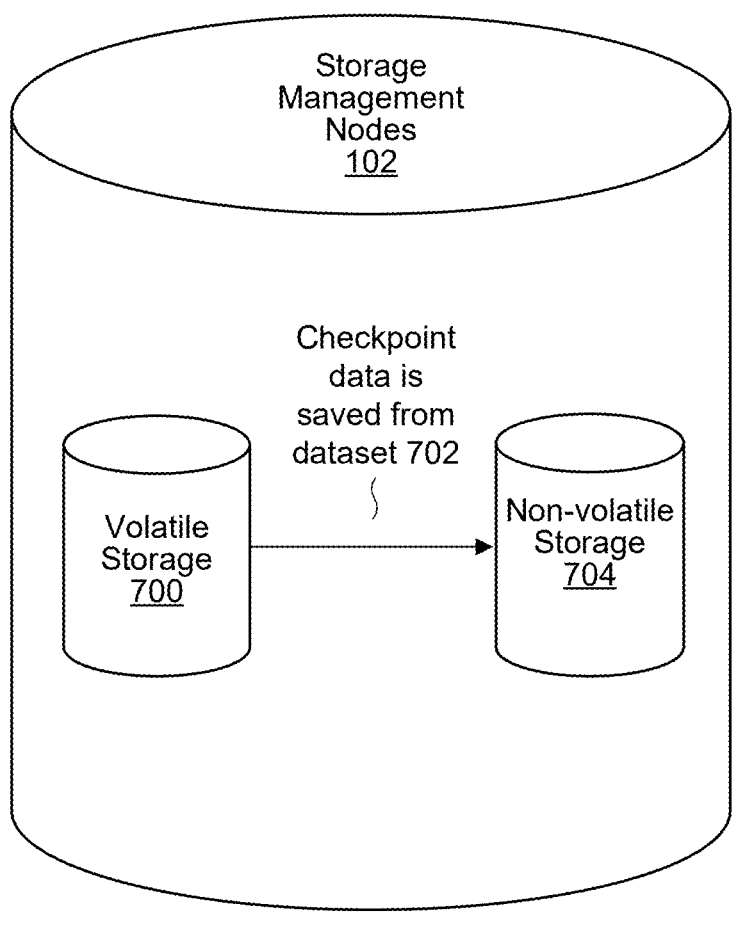
FIG. 7 is a block diagram illustrating a flow of information with regard to generation of checkpoint data, according to some embodiments.

FIG. 7 is a block diagram illustrating a flow of information with regard to generation of checkpoint data, according to some embodiments.

The storage management nodes 102 may save checkpoint data of the database by saving the checkpoint data, at 702, from volatile storage 700 to non-volatile storage. A working copy of the database may be maintained in volatile storage 700, where the storage management nodes 102 may attempt to execute transactions. Volatile storage 700 may be memory such as RAM (random access memory), which may be faster or more convenient to read from or write to than non-volatile storage 704. Non-volatile storage 704 may be storage types such as ROM (read-only memory), which are able to be read after a crash at the storage management nodes 102. In some embodiments, the checkpoints may be stored to local non-volatile storage or may be stored remotely in non-volatile storage, such in a separate data storage system. Logs, such as redo logs and summary logs, may be trimmed to the time recorded in checkpoint data.

FIG. 8 is a flowchart illustrating a method of performed at a durable multi-log database system supporting cross-node transactions with regard to a write transaction, according to some embodiments.

At 800, the transaction management component receives a transaction that is to be executed across multiple storage management nodes maintaining a database.

At 802, the transaction management component identifies the multiple storage management nodes the transaction is to be executed across.

At 804, the transaction management component sends the transaction to the identified storage management nodes.

At 806, the storage management nodes execute the transaction.

At 808, the redo logs associated with the storage management nodes log the transaction and the outcome of the transaction.

At 810, the redo logs send acknowledgements of the execution and logging to the transaction management component, including the outcomes of the transaction executions.

At 812 the transaction management component determines the transaction has been executed and logged at the relevant nodes, and thus that the transaction has been successfully committed and is durable. The transaction management component may provide the requesting client for the transaction with an indication that the transaction has been durably committed after the transaction management component determines the transaction has been executed and logged at the relevant nodes, without performing additional logging.

At 814, the transaction management component acknowledges the transaction as committed. The transaction management component may acknowledge the transaction as committed by reporting to a requesting client that the transition is committed.

At 816, the transaction management component logs the transaction to a summary log. In some embodiments, the transaction management component provides an acknowledgement to a requesting client that the transaction was committed without waiting for the transaction to be written to the summary log.

FIG. 9 is a flowchart illustrating a method of performing crash recovery for a durable multi-log database system supporting cross-node transactions, according to some embodiments.

At 900, the transaction management component may detect a crash at one or more storage management nodes.

At 902, the transaction management component may obtain a previously saved set of checkpoint data.

At 904, the transaction management component may load the checkpoint data across the crashed storage management nodes. Also, in some embodiments, the storage management nodes may directly retrieve the relevant snapshots in response to a crash (e.g. without relying on coordination by the transaction management component).

At 906, the storage management nodes may re-execute transactions that have been logged at the summary log as being successfully completed, wherein the transactions in the summary log were executed between the time the checkpoint data was generated and the time of the crash.

At 908, the transaction management component may determine which transactions logged in redo logs of the storage management nodes were successfully completed across all relevant storage management nodes. For example, there may be some transactions that were committed and that are reflected as committed in the redo logs, for which a summary log entry has not yet been written at the time of the crash. The transaction management component may determine which transactions were successfully completed based on the replay logs containing a summary acknowledgment for a transaction or based on a number of entries in the redo logs reporting a successful execution of the transaction, where the number is the same as the count of relevant number of redo logs indicated in the redo log entries, for example total number of redo logs 506. In some embodiments, the transaction management component may use another number for the number of entries in the redo logs reporting a successful execution of the transaction.

At 910, the storage management node may re-execute the successful transactions logged in the redo logs. After 910, the database may have a state that reflects all committed transactions committed to the database immediately prior to the crash.

FIG. 10A is a flowchart illustrating a method of generating checkpoint data for a durable multi-log database system supporting cross-node transactions, according to some embodiments.

At 1000, a transaction management component may begin generating checkpoint data of one or more storage management nodes. At 1002, the transaction management component may wait until transactions in-progress at the time of beginning to generate checkpoint data are logged at redo logs and acknowledged to the transaction management component or abandoned. At 1004, the transaction management component may update the checkpoint data with the results of the transactions that were in-progress at the time of beginning to generate checkpoint data. At 1006, the transaction management component may store the checkpoint data to be durable to a crash at the one or more of the storage management nodes, for example by storing the checkpoint data in non-volatile storage.

FIG. 10B is a flowchart illustrating a method of updating checkpoint data using partial recovery, according to some embodiments.

At 1008, a durable multi-log database system may reconstruct the database, or a portion of the database, from previous checkpoint data, or a portion of previous checkpoint data, to one or more virtual machines unrelated to the storage management nodes. The durable multi-log database system may use multiple virtual machines to increase the throughput of generating checkpoint data. The durable multi-log database system may use virtual machines unrelated to the storage management nodes so that the checkpoint data generation does not affect the operation of the database.

At 1010, the durable multi-log database system may replay transactions from the summary log to the reconstructed database or portion of the database. The summary log may not include every transaction that has been committed at the time of generating the checkpoint data. The transactions not included in the summary log at the time of generating the checkpoint data remain durably stored at the redo logs.

At 1012, the durable multi-log database system may generate checkpoint data for the one or more virtual machines. The checkpoint data may include transactions up to the end of the summary log.

At 1014, the durable multi-log database system may store the checkpoint data in non-volatile storage. After 1014, the durable multi-log database system may trim the redo logs and summary log to the point the transactions are included in the stored checkpoint data.

FIG. 10C is a flowchart illustrating a method of adding an entry to a summary log of a durable multi-log database system supporting cross-node transactions, according to some embodiments.

The transaction management component, to perform step 816 of logging the transaction to a summary log, may, at 1016, add an entry comprising a transaction number and outcome bit to the summary log. The transaction number may be a transaction identifier 500 or secondary transaction identifier 504 for example, an outcome bit may be a summary acknowledgment 518 for example.

FIG. 10D is a flowchart illustrating a method of logging information in an added entry of the summary log, according to some embodiments.

The transaction management component, to perform step 816 of logging the transaction to a summary log, may, at 1018, wait for multiple transaction outcomes to accrue. The multiple transaction outcomes may be called a batch. At 1020, the transaction management component may log the multiple accrued transactions to the summary log as a batch.

Example Computer System

Figure 11:
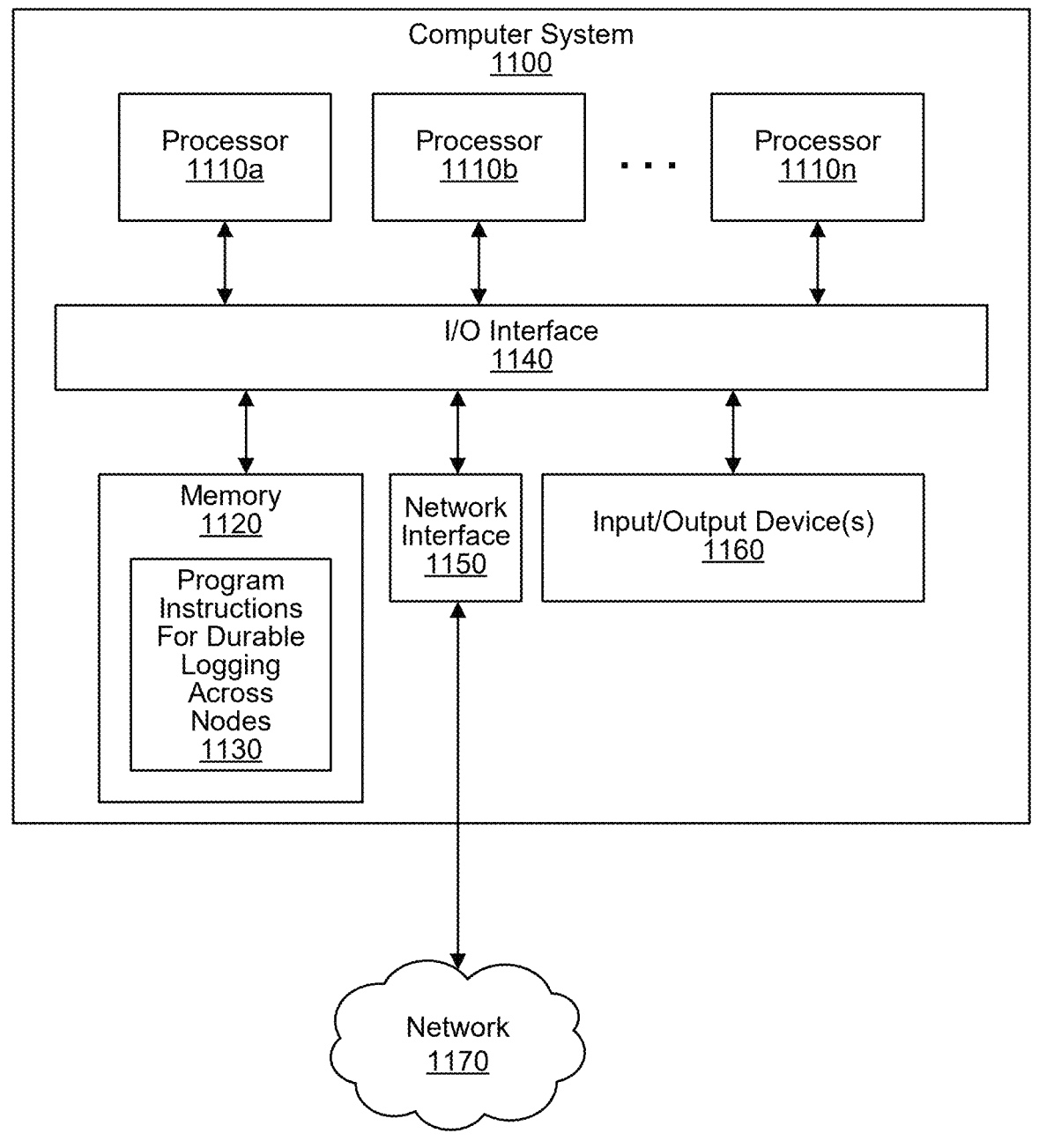
FIG. 11 is a block diagram illustrating an example computer system that implements some or all of the techniques described herein, according to some embodiments.

FIG. 11 is a block diagram illustrating an example computer system that implements some or all of the techniques described herein, according to some embodiments.

FIG. 11 illustrates exemplary computer system 1100 usable to implement the durable logging across nodes system as described above with reference to FIGS. 1-10C. In different embodiments, computer system 1100 may be any of various types of devices, including, but not limited to, a network computer, a mobile device, a consumer device, application server, storage device, a peripheral device such as a switch, modem, router, or in general any type of computing or electronic device.

Various embodiments of program instructions for a durable logging across nodes system, as described herein, may be executed in one or more computer systems 1100, which may interact with various other devices. Note that any component, action, or functionality described above with respect to FIGS. 1-10C may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1140. Computer system 1100 further includes a network interface 1150 coupled to I/O interface 1140, and one or more input/output devices 1160. In some cases, it is contemplated that embodiments may be implemented using a single instance of computer system 1100, while in other embodiments multiple such computer systems, or multiple nodes making up computer system 1100, may be configured to host different portions or instances program instructions as described above for various embodiments. For example, in one embodiment some elements of the program instructions may be implemented via one or more nodes of computer system 1100 that are distinct from those nodes implementing other elements.

In some embodiments, computer system 1100 may be implemented as a system on a chip (SoC). For example, in some embodiments, processors 1110, memory 1120, I/O interface 1140 (e.g., a fabric), etc. may be implemented in a single SoC comprising multiple components integrated into a single chip. For example, a SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1120 may be configured to store compression or decompression program instructions for a durable logging across nodes system 1130 accessible by one or more of the processors 1110. In various embodiments, system memory 1120 may be implemented using any suitable memory technology, such as static random-access memory (SRAM), synchronous dynamic RAM (SDRAM), nonvolatile/Flash-type memory, or any other type of memory. In the illustrated embodiment, program instructions for a durable logging across nodes system 1130 may be configured to implement any of the functionality described above. In some embodiments, program instructions and/or data may be received, sent or stored upon different types of computer-accessible media or on similar media separate from system memory 1120 or computer system 1100.

In one embodiment, I/O interface 1140 may be configured to coordinate I/O traffic between processor 1110, system memory 1120, and any peripheral devices in the device, including network interface 1150 or other peripheral interfaces, such as input/output devices 1160. In some embodiments, I/O interface 1140 may perform any necessary protocol, timing or other data transformations to convert data signals from one component (e.g., system memory 1120) into a format suitable for use by another component (e.g., processor 1110). In some embodiments, I/O interface 1140 may include support for devices attached through various types of peripheral buses, such as a variant of the Peripheral Component Interconnect (PCI) bus standard or the Universal Serial Bus (USB) standard, for example. In some embodiments, the function of I/O interface 1140 may be split into two or more separate components, such as a north bridge and a south bridge, for example. Also, in some embodiments, some or all of the functionality of I/O interface 1140, such as an interface to system memory 1120, may be incorporated directly into processor 1110.

Network interface 1150 may be configured to allow data to be exchanged between computer system 1100 and other devices attached to a network 1170 (e.g., carrier or agent devices) or between nodes of computer system 1100. Network 1170 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1150 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1160 may, in some embodiments, include one or more display terminals, keyboards, keypads, touchpads, scanning devices, voice or optical recognition devices, or any other devices suitable for entering or accessing data by one or more computer systems 1100. Multiple input/output devices 1160 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1150.

As shown in FIG. 11, memory 1120 may include program instructions for a durable logging across nodes system 1130, which may be processor-executable to implement any element or action described above. In one embodiment, the program instructions may implement the methods described above. In other embodiments, different elements and data may be included.

Computer system 1100 may also be connected to other devices that are not illustrated, or instead may operate as a stand-alone system. In addition, the functionality provided by the illustrated components may in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   a transaction management component;

a plurality of storage management nodes; and
   a plurality of nodes configured to implement logs respectively associated with respective ones of the plurality of storage management nodes;
   wherein the transaction management component is configured to:
   receive a transaction comprising an intended change to be performed for a dataset;
   cause the transaction to be distributed to a set of the plurality of storage management nodes managing data of the dataset implicated by the change, wherein the respective storage management nodes of the set cause the transaction to be logged at respective logs that are respectively associated with the respective storage management nodes of the set;
   receive, from the storage management nodes of the set of the plurality of storage management nodes managing the data of the dataset implicated by the change, acknowledgements the transaction has been written in relevant ones of the respective logs associated with the respective storage management nodes of the set of the plurality of storage management nodes managing the data of the dataset implicated by the change; and
   provide, in response to receiving the acknowledgments from the storage management nodes of the set, a response that the transaction has been committed,
   wherein the transaction management component provides the response in response to receiving the acknowledgments without waiting for a summary entry of the acknowledgements to be written.

2. The system of claim 1, wherein the transaction management component is further configured to:
   cause a summary entry of the acknowledgments to be written at a summary log, wherein the transaction management component provides a response that the transaction has been committed independently of causing the summary entry of the acknowledgments to be written at the summary log.

3. The system of claim 1 wherein the transaction management component is further configured to:
   identify the set of storage management nodes of the plurality of storage management nodes that the transaction is associated with, wherein a first storage management node of the set and a second storage management node of the set are responsible for respective pieces of data that have a dependency relationship such that a change processed at the first storage management node or the second storage management node implicates a dependent change to be processed at an other one of the first or second storage management node.

4. The system of claim 1, wherein respective ones of the storage management nodes are further configured to, in response to a crash:
   reconstruct a portion of the dataset managed by that respective storage management node using checkpoint data;
   re-execute one or more transactions recorded in the log associated with that respective storage management node for which there is an indication that a summary acknowledgment entry has been written, wherein the one or more transactions having the summary acknowledgement entry written have been committed; and
   evaluate for re-execution one or more additional transactions recorded in the log associated with that respective storage management node, wherein a summary acknowledgment entry has not been written for the one or more additional transactions.

5. The system of claim 4, wherein to evaluate for re-execution the one or more additional transactions, the respective ones of the storage management nodes are configured to, for a given one of the one or more additional transactions:

coordinate with the transaction management component to determine if other ones of the set of storage management nodes have acknowledged that the given additional transaction was written in the logs associated with the other storage management nodes of the set; and in response to receiving an indication that the other storage management nodes of the set have acknowledged that the given additional transaction was written in their logs, re-execute the given additional transaction at the respective storage management node; and in response to determining that less than all of the other storage management nodes of the set have acknowledged that the given transaction was written in their logs, refrain from re-executing the given additional transaction at the respective storage management node.

6. The system of claim 1, wherein the plurality of storage management nodes and the transaction management component are implemented in a same availability zone, and the plurality of nodes configured to implement the logs respectively associated with the respective ones of the plurality of storage management nodes are implemented across two or more geographically separated availability zones.

7. The system of claim 1, wherein the transaction management component causes the summary entry acknowledgments to be logged at a summary log as a batch of summary entry acknowledgments.

8. A method, comprising:

receiving a transaction, wherein the transaction comprises an intended change to a dataset stored across a plurality of nodes;

receiving, at a management component for the plurality of nodes, acknowledgements that the transaction has been committed at respective specific nodes;

providing a response indicating the transaction has been committed for the dataset; and logging, at a summary log, a summary acknowledgement that the transaction has been committed.

9. The method of claim 8, wherein said providing the response indicating the transaction has been committed for the dataset is performed before said logging is performed at the summary log.

10. The method of claim 8, wherein:

committing the transaction at the respective specific nodes comprises logging the transaction at a plurality of logs respectively associated with the respective specific nodes.

11. The method of claim 10, further comprising:

performing, in response to a crash at one or more nodes of the plurality of nodes:

obtaining checkpoint data, reconstructing the dataset for the plurality of nodes using the checkpoint data;

re-executing one or more transactions logged at the summary log to the dataset reconstructed from the checkpoint data, wherein the one or more transactions recorded in the summary log have been committed; and re-executing one or more additional transactions that have been committed and are recorded in the plurality of logs to the dataset reconstructed from the checkpoint data, wherein the one or more additional transactions have not yet been recorded to the summary log, wherein the one or more additional transactions are determined to have been committed at the respective specific nodes.

12. The method of claim 11, further comprising determining a particular transaction of the one or more additional transactions has been committed at the respective specific nodes based on a presence of one or more summary acknowledgments of the particular transaction in the plurality of logs.

13. The method of claim 11, further comprising determining a particular transaction of the one or more additional transactions has been committed at the respective specific nodes based on a presence of log entries corresponding to the particular transaction in the plurality of logs respectively associated with the respective specific nodes.

14. The method of claim 11, further comprising:

generating the checkpoint data from the plurality of nodes; and storing the checkpoint data in non-volatile storage.

15. The method of claim 8, wherein said logging comprises sending the summary acknowledgement to one or more storage devices geographically separated from the plurality of nodes.

16. The method of claim 8, wherein the summary acknowledgment comprises a transaction number and an outcome bit written to the summary log.

17. The method of claim 8, wherein the management component causes the outcomes of the executions of the transaction at specific nodes to be logged at the summary log in a batch of summary acknowledgements.

18. A non-transitory storage medium storing program instructions that, when executed on or across one or more processors, cause the one or more processors to:

receive a transaction, wherein the transaction comprises an intended change to a dataset stored across a plurality of nodes;

receive, at a management component, acknowledgments that the transaction has been committed to specific nodes associated with the transaction;

provide a response indicating the transaction has been committed; and log, at a summary log, that the transaction has been committed at the specific nodes.

19. The storage media of claim 18, wherein the program instructions, when executed on or across the one or more processors, further cause the one or more processors to log the transaction at a plurality of logs respectively associated with the specific nodes.

20. The storage media of claim 19, wherein the program instructions, when executed on or across the one or more processors, further cause the one or more processors, in response to a crash at one or more of the plurality of nodes, to:

obtain checkpoint data, reconstruct the dataset for the plurality of nodes using the checkpoint data;

re-execute one or more transactions logged at the summary log to the dataset reconstructed from the checkpoint data, wherein the one or more transactions recorded in the summary log have been committed; and re-execute one or more additional transactions recorded in the plurality of logs to the dataset reconstructed from the checkpoint data.

* * * * *